July 27, 1943.　　　J. G. BLUNT　　　2,325,468
RAILWAY VEHICLE TRUCK
Filed April 11, 1942　　　4 Sheets-Sheet 1
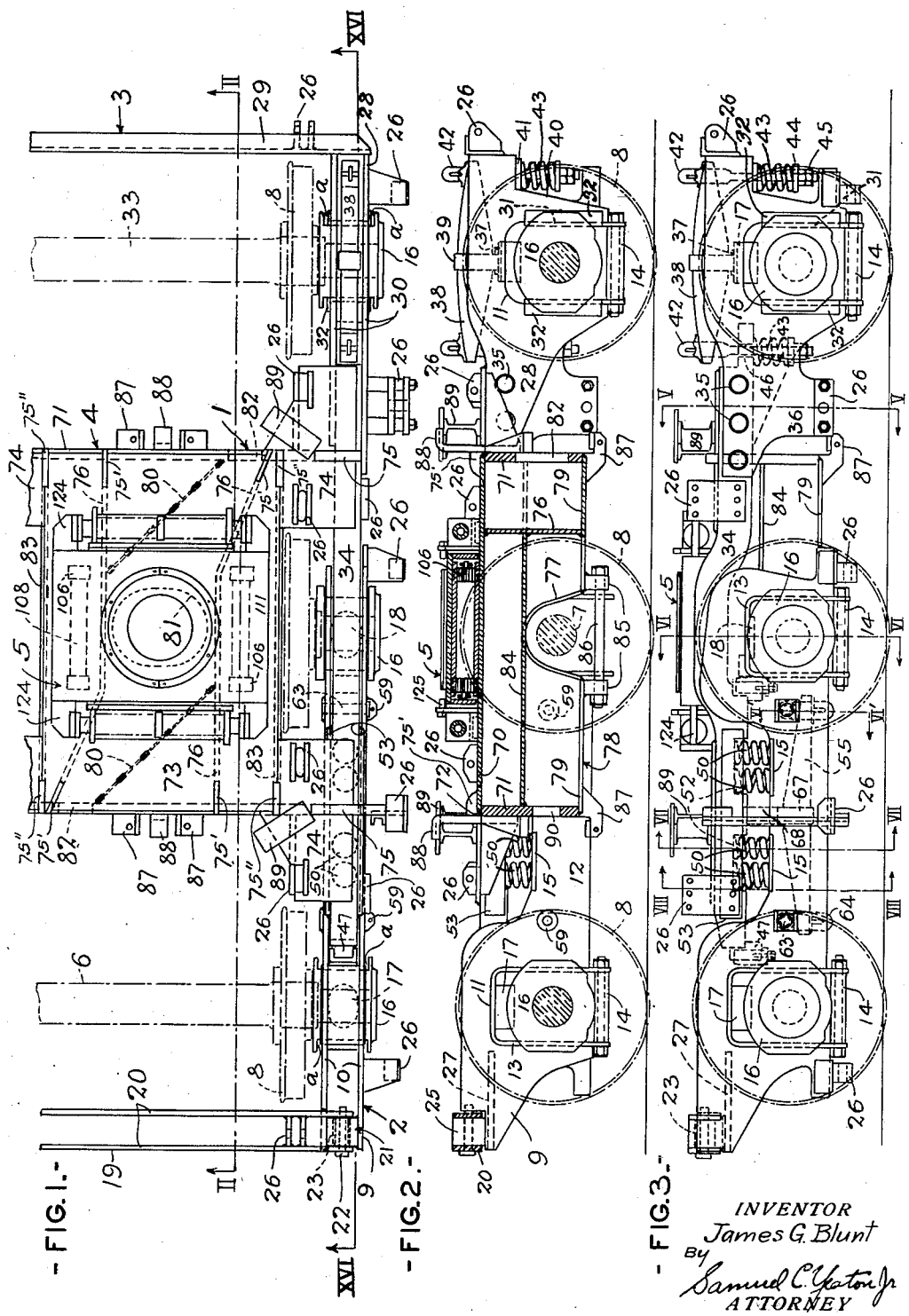
INVENTOR
James G. Blunt
By
Samuel C. Yaton Jr
ATTORNEY

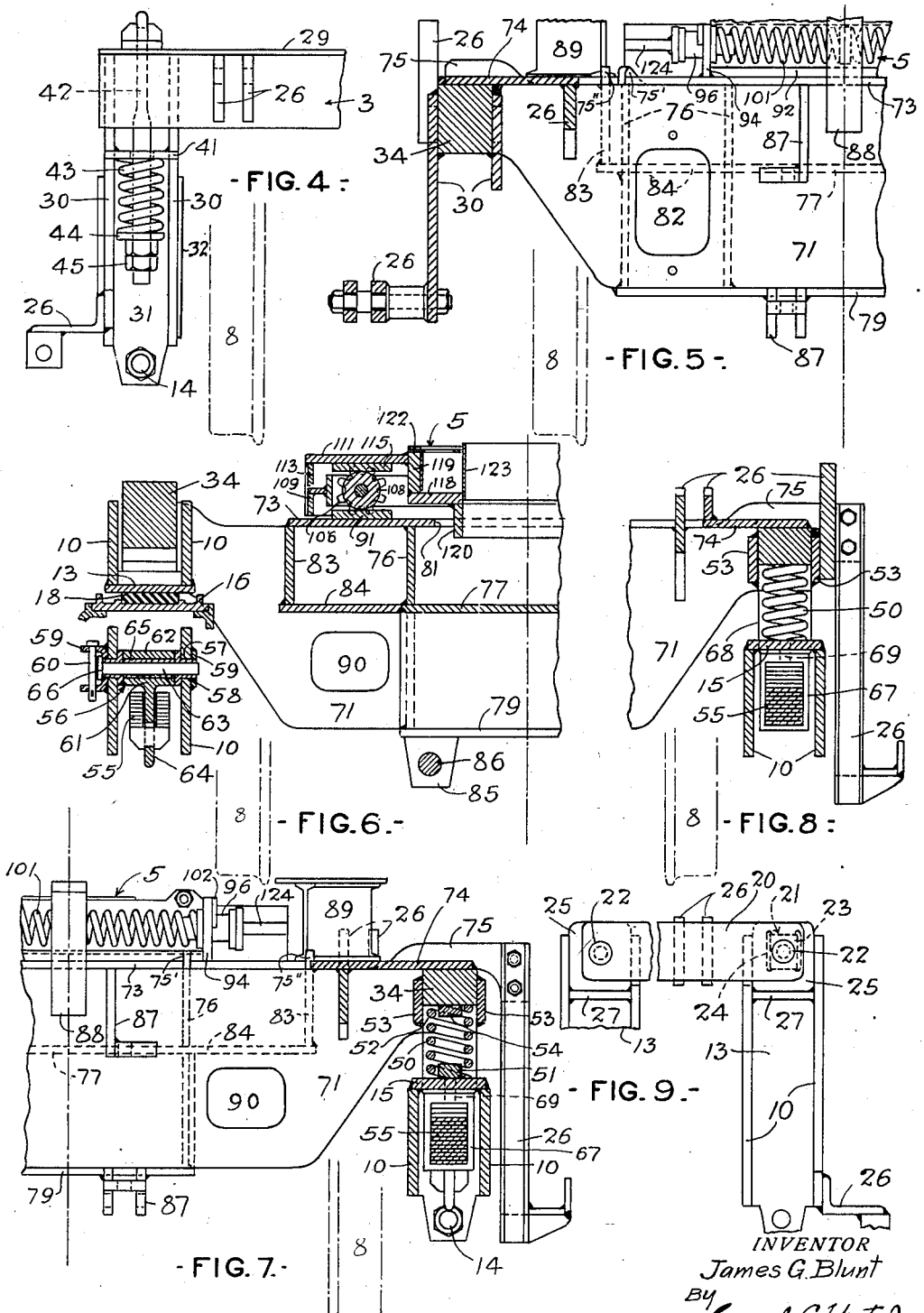
July 27, 1943.  J. G. BLUNT  2,325,468
RAILWAY VEHICLE TRUCK
Filed April 11, 1942  4 Sheets-Sheet 2
INVENTOR
James G. Blunt
BY
Samuel C. Yeaton Jr.
ATTORNEY

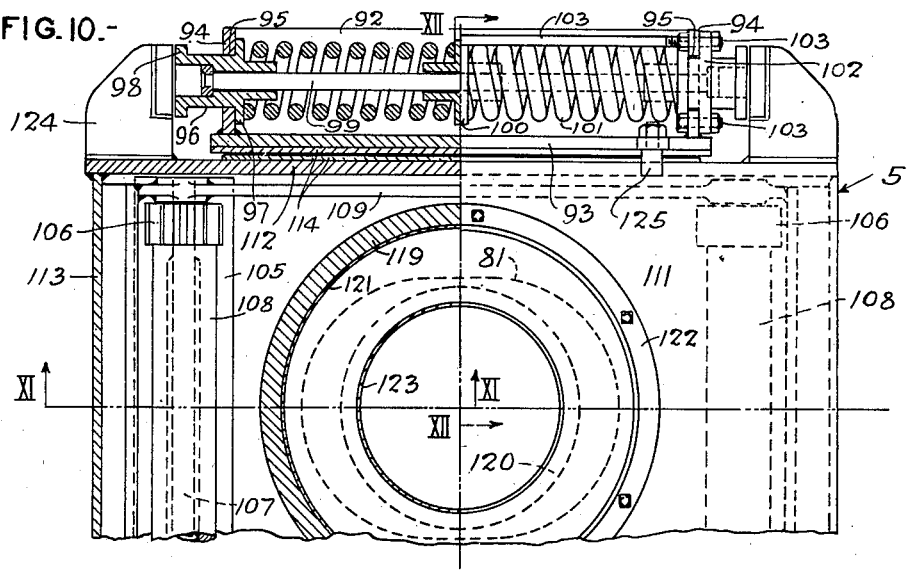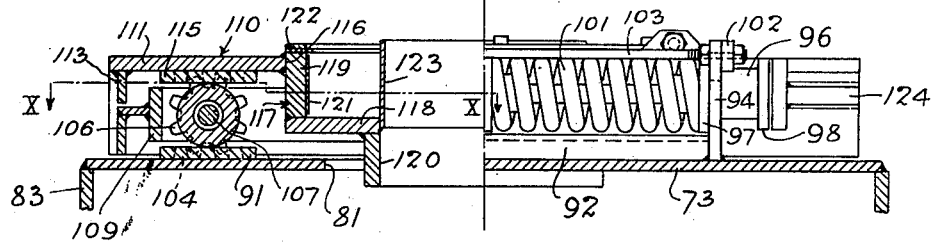

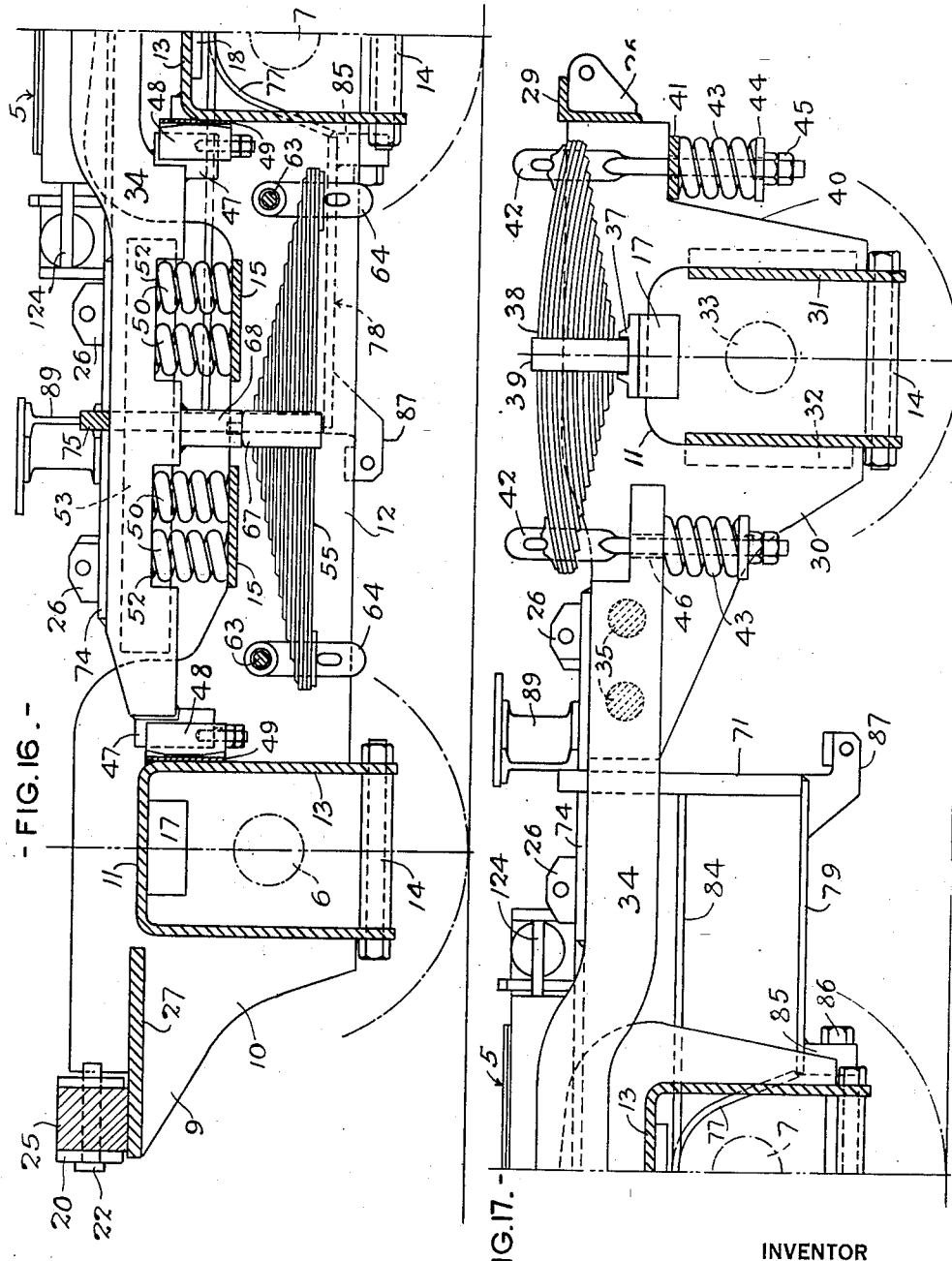

Patented July 27, 1943

2,325,468

UNITED STATES PATENT OFFICE 2,325,468

RAILWAY VEHICLE TRUCK

James G. Blunt, Schenectady, N. Y., assignor to American Locomotive Company, New York, N. Y., a corporation of New York Application April 11, 1942, Serial No. 438,543

8 Claims. (Cl. 105—196)

This invention relates to railway vehicle trucks, and more particularly to a six-wheel welded truck having a two-wheel and a four-wheel section.

It is well known that welded trucks have characteristics which make them desirable for use with certain types of railway vehicles. An object of the present invention is to devise a six-wheel welded truck having a four-wheel section and a two-wheel section connected together, the truck being of simple construction and having features which make it more desirable for its intended purposes than conventional six-wheel trucks.

A further object is to provide a truck as aforedescribed having great strength, a minimum of parts and a short wheel base, the truck being provided with means effecting longitudinal alignment of the two sections when on curved or tangent track.

A further object is to provide a six-wheel truck having a four-wheel and a two-wheel section connected together, the construction of the truck being such that the truck has universally cushioned flexibility, and is adjustable to all misalignment causes when traversing the right of way such as will most perfectly conform it and coordinate its movement with nature's laws of motion and force, the truck being adapted to be operated in either direction and to glide through all specified variations of track curvature, equalizing and thus reducing to a minimum wheel flange and hub binding pressures resulting from centrifugal and other disturbing forces.

A further object is to provide an improved spring rigging for the aforesaid six-wheel truck.

A further object is to provide a welded truck fabricated by employing an improved method of welding insuring great weight-carrying strength.

A further object is to provide a six-wheel truck having an improved lateral motion center plate device.

Other and further objects of this invention will appear from the following description, the accompanying drawings and the appended claims.

Referring to the drawings forming a part of this application, Figure 1 is a plan view, partly broken away, of the six-wheel truck of the present invention, parts being indicated in dot and dash lines; Fig. 2 is a vertical section of the truck taken on the line II—II of Fig. 1, parts being indicated in dot and dash lines and parts being shown in full, the axles being sectioned in dot and dash lines; Fig. 3 is a side elevation of the truck of Fig. 1, parts being indicated in dot and dash lines; Figs. 4-8 are enlarged views of portions of the truck, parts being indicated in dot and dash lines, Fig. 4 being an elevation as viewed from the right of Fig. 3; Fig. 5 a section on the line V—V of Fig. 3; Fig. 6 a section partly on the line VI—VI of Fig. 3, and partly on the line VI'—VI' of Fig. 3, parts being shown in full; Fig. 7 a section on the line VII—VII of Fig. 3; and Fig. 8 a section on the line VIII—VIII of Fig. 3; Fig. 9 is an enlarged foreshortened elevation of a portion of the four-wheel section of the truck as viewed from the left of Fig. 3; Fig. 10, at the right, is an enlarged plan view of the lateral motion center plate device of the truck, and at the left a section on the line X—X of Fig. 11, parts being shown in full and parts being broken away; Fig. 11, at the right, is an enlarged elevation of the lateral motion center plate device as viewed from the front of Fig. 10, and at the left a section on the line XI—XI of Fig. 10, a portion of the cross member of the truck being shown in section; Fig. 12, at the right, is an enlarged elevation of the lateral motion center plate device as viewed from the left of Fig. 10, and at the left a section on the line XII—XII of Fig. 10, a portion of the cross member of the truck being shown in section; Fig. 13 is an enlarged view of a portion of the truck showing the extreme rear part of the two-wheel section and its association with the four-wheel section; Fig. 14 is a plan view of the structure shown in Fig. 13; Fig. 15 is a section on the line XV—XV of Fig. 13; and Figs. 16 and 17 are enlarged sections on the line XVI—XVI of Fig. 1, Fig. 16 showing the left half of the truck and Fig. 17 showing the right half thereof, parts being indicated in dot and dash lines and parts being omitted.

The six-wheel truck is indicated generally in the drawings by the reference numeral 1. It includes a four-wheel section 2, a separate two-wheel section 3, a cross member 4 welded to the section 3, and a lateral motion center plate device 5 supported on the cross member 4. The truck is adapted to move with equal efficiency in either direction, but for the purpose of the following description the section 3 will be considered at the forward end of the truck.

Section 2 has a rear axle 6 and an axle 7 forward thereof and forming the truck intermediate axle. Wheels 8 are mounted on the axles. There is a separate independent side frame member 9 on each side of section 2, each member 9 being a built-up welded structure made entirely of flat plate cut and bent appropriately. As the members 9 are similar except that they are constructed for opposite sides of the truck, a description of one will suffice, namely the one shown in Fig. 1. However, where the other member 9 is shown, the reference numerals will be applied to it.

Side frame member 9 includes two longitudinally extending transversely spaced plates 10 having openings therein forming pedestal jaws 11 for the journals of the axles adjacent thereto, and a depressed central spring-supporting portion 12. The plates 10 are connected together by various transverse members welded thereto, for instance, there is a U-shaped pedestal jaw member 13 welded in each jaw 11. The pedestal jaws are closed at their bottoms in the usual manner by tie bolts and spacers, indicated by the reference numeral 14. Horizontal spring seats 15 are welded to and connect the two plates 10 at the upper edge of the depressed portion 12.

A journal box 16 is disposed in each of the jaws. The truck is adapted to interchangeably receive any commercial type of plain or roller bearings (not shown). The journal boxes of axle 6 are adapted to move laterally a small extent relative to the side frame members, clearances $a$ being provided between the box flanges and members 13, but the journal boxes of the axle 7 have no such lateral movement. In Fig. 1 the flanges of the boxes of axle 7 are shown thicker than those of the boxes of axle 6, preventing the lateral movement. If desired, this thickness can be attained by welded filler pieces. The members 13 or boxes, or both, will carry welded wear plates in the usual manner.

A rubber centering device 17 seats on top of the rear axle journal box, and the rear end of the side frame member rests on top of this device by means of the adjacent member 13. Device 17 may be secured against displacement by a dowel extending into an orifice in member 13, and by transverse flanges on the top of the journal box. These means are not shown in the drawings. Device 17 may be a solid block of rubber or other resilient material, or it may be made in alternate layers of rubber and metal plates vulcanized together. It applies increasing resistance to lateral movement of the journal box relative to its side frame member and centers same. A relatively thin block 18, which may be of any suitable somewhat resilient material, seats on top of the journal box of the intermediate axle 7 and the adjacent member 13 seats thereon.

A brake hanger bar 19 extends between and is flexibly connected to the rear ends of the side frame members 9, one connection being pivotal and the other slidable and pivotal. It is of built-up welded construction and includes two longitudinally spaced transversely extending plates 20.

The slidable and pivotal connection is indicated by the reference numeral 21 and is best shown in Fig. 9. It consists of a pivot pin 22 which extends through the plates 20 and through a block 23 disposed therebetween. Block 23 is slidably disposed in an orifice 24 in a block 25 which is disposed between the plates 10 and welded thereto, the orifice in the block 25 being longer transversely than the block 23, permitting some lateral sliding movement of the block 23 relative to block 25, and preventing bar 19 from rigidly connecting the side frame members 9. The other end of bar 19 is pivotally secured, by another pin 22, to another block 25. The pivot pins 22 permit the bar 19 to assume inclined positions during vertical relative movements of the side frame members. The inner plates 10 are cut away (see Fig. 2) adjacent blocks 25 to permit the plates 20 to overlap blocks 25.

There are various brake rigging brackets, lugs, etc., welded or otherwise connected to the bar 19, side frame members 9, and to other parts of the truck not yet described. As the brake rigging, other than the bar 19, is not shown in the drawings, forming no part of the present invention, these various brake rigging parts will all be designated by the same numeral 26 and no description thereof will be given. It is contemplated that a brake rigging adapted for use with either single or double brake shoes will be employed.

The rear ends of the side frame members are reinforced by a horizontal plate 27, which also supports blocks 25. At the depressed portion 12, the plates 10 form a channel open at the bottom for a purpose presently to appear.

The two-wheel section also has welded built-up side frame members, indicated by the numeral 28, only one of which will be described, appropriate numerals being applied to the other where shown. These members are rigidly connected at their forward ends by an angle iron cross bar 29 which is welded directly to the side frame members 28.

The side frame member 28 includes two transversely spaced longitudinally extending plates 30 connected by welded transverse members. Pedestal jaws 11 are formed in the plates 30 which are connected in the jaws by transverse plates 31 welded thereto and having formed thereon or welded thereto flanges 32 overlapping the plates 30.

In the main, the pedestal jaws of the two-wheel section are like the rear pedestal jaws of the four-wheel section, except that they are open above the journal box 16 disposed therein, and former remarks made in relation to the journal box and pedestal jaws of the rear axle 6 apply equally as well to the two-wheel section, the axle of which is designated by the numeral 33.

At its rear end the side frame member 28 is secured to a rearwardly extending pedestal piece or leg 34 which is substantially rectangular in cross section and is formed of solid bar material, legs 34 forming extensions of members 28. The plates 30 are welded to the leg 34 in a manner to put the welds in shear instead of in tension. This is accomplished by punching round openings 35, best shown in Fig. 3, in the plates 30 and fillet welding the inside edges of the openings to the leg. There are two or three such openings in each plate 30, to provide a sufficiently strong connection between the side frame member 28 and the leg.

The outer plate 30 includes a depending portion 36 for a brake rigging part 26. Otherwise plates 30 of a side frame member 28 are substantially similar in shape. The journal boxes of axle 33 can move laterally in their pedestal jaws similar to the journal boxes of axle 6. A rubber centering device 17 rests on top of the journal box and extends upwardly between the plates 30.

All the devices 17 provide some vertical resiliency, but principally yieldingly resist lateral movement of the journal boxes, centering them in their pedestals when lateral movement forces have terminated, as aforesaid. As only the journal boxes of axles 6 and 33 can move laterally relative to the side frame members, no device 17 is needed over the boxes of the axle 7. The block 18 provides some resiliency vertically and is more suitable because of the limited space above axle 7.

A spring seat 37 rests on top of the centering device 17 of axle 33, and a semi-elliptic leaf spring 38, having a central spring band 39, rests, through the band 29, upon the spring seat, spring 38 extending longitudinally between the plates 30. The plates 30 adjacent the forward side of the pedestal jaw are cut away rearwardly, providing a recess 40 having a horizontal top wall formed by a spring seat 41 extending between and welded to the plates 30. A hanger 42 depends from the forward end of the spring 38 to which it is secured by the usual clip and gib, through an orifice in the seat 41, and through a coil spring 43 which bears against the bottom face of the seat 41, the hanger being secured to the bottom end of the spring 43 by a cap 44 and nuts 45.

A similar hanger 42 depends from the rear end of the semi-elliptic spring through an orifice 46 in the forward end of the leg 34 and through another coil spring 43, which bears against the bottom face of the leg 34, this hanger being secured to the coil spring similar to the forward hanger 42. Coil springs 43 and semi-elliptic spring 38 operate in series, the side frame member 28 being supported on the coil springs which take the full load, the coil springs being supported directly on the hangers which transmit the full load to the semi-elliptic spring. The semi-elliptic spring is held against lateral movement by the plates 30.

Leg 34 extends rearwardly. It is bowed upwardly over the intermediate journal box and extends almost to the rear pedestal jaw. It has only slight clearance between the plates 10 and thus it longitudinally aligns the two sections of the truck, permitting, however, vertical relative movement between them. At its extreme rear end, the leg 34 has welded thereto a block 47, see Figs. 13-15, to which is bolted a shoe 48 having convex side and rear faces. The shoe fits in a channel-shaped wear plate 49 which is welded to the plates 10 and adjacent member 13. The shoes are not fastened to the four-wheel section but move bodily vertically relative thereto and can pivot slightly due to the convex faces. A similar construction is secured to leg 34 at the rear of the pedestal jaw of the intermediate axle 7. The four shoes 48 of the truck thus take the longitudinal thrusts between the two truck sections, preserve squareness of the truck and permit vertical and tilting relative movements between the truck sections.

Leg 34 is spring-supported on portion 12. Four coil springs 50 are supported at their bottoms on the two spring seats 15 and are secured thereto by bosses 51 (Fig. 7). They support the rear end of leg 34, in which is formed two recesses 52 for housing the upper ends of the springs 50. Side plates 53 are welded to the sides of the leg adjacent the recesses to form retainers for the coil springs, each plate 53 overlapping both recesses. Bosses 54 welded to the leg 34 and disposed inside the upper portion of the springs 50 further act as retainers. Springs 50 act in parallel.

A semi-elliptic leaf spring 55, having its main leaf at the bottom, is disposed between the plates 10 at the depressed portion 12. It is supported at its ends by spring hanger devices 56, see Fig. 6. Each device is mounted in aligned orifices 57 in the side plates 10. A flanged bushing 58 is disposed in each orifice with its flange engaging the inner face of the adjacent plate 10, and with its bushing portion extending through the orifice and beyond the plate 10 adjacent thereto and also through an orifice in a reinforcing plate 59 welded to the outer face of the adjacent plate 10. This bushing portion and reinforcing plate afford increased bearing surface. The plate 59 on the inner plate 10 is washer-shaped, but the plate 59 on the outer plate 10 is channel-shaped, the legs of the channel having vertically aligned orifices for a retaining pin 60, all as is clearly shown in Fig. 6. A hanger 61 is disposed between the flanges of the bushings 58. It includes a horizontal orificed bearing 62 mounted on a pin 63 which extends through the bushings 58, and a depending leg 64 which extends through orifices in the leaves of the spring 55 in the usual manner, the usual gibs being provided in the bottom of the hangers upon which the ends of the spring 55 rest. The bearing 62 is provided with a bushing 65 in engagement with the pin 63, which has a head 66 disposed between the pin 60 and the adjacent plate 59.

The leg 34 is supported on top of a spring band 67 of the spring 55 by means of a block 68 which is welded, at its upper transverse edges, to the leg and is secured to the spring band by a dowel 69 (Fig. 8). Springs 50, considered collectively, and spring 55 act in parallel, the leg 34 being supported on both the springs 50 and 55 so that each takes its allotted share of the load. Springs 50 and 55, taken together, are in parallel with springs 38 and 43, taken together, that is to say, the load on the two-wheel truck section is distributed in parallel between the springs at the forward end and the springs at the rear end.

The truck has universally cushioned flexibility and is adjustable to all misalignment causes when traversing the right of way such as will most perfectly conform its movements to, and coordinate them with, nature's laws of motion and force. This result is attributed to the rubber centering devices, lateral motion of forward and rear axles, blocks 18, flexibility of connection between the four-wheel and two-wheel sections, independency of side frames of four-wheel section, convexity of the shoes 48, and as will later more fully appear, the lateral motion center plate device.

This flexibility further enables the truck to glide through all specified variations of track curvature, equalizing the wheel flange and hub binding pressures resulting from centrifugal and other disturbing forces and reducing them to a minimum.

The cross member 4 is supported on and welded directly to the legs 34, rigidly connecting them and further forming a rigid construction of the two-wheel section. The cross member 4 is a built-up welded construction made substantially entirely of flat plate. All of the separate horizontal pieces of plate of the cross member, where possible, are supported on top of the vertical pieces, insuring a light design of maximum strength. In such a truck it is possible to limit the number of parts to a minimum and to keep the wheel base short. This construction of overlapping horizontal pieces on top of vertical pieces is followed in the two sections of the truck also, where possible, that is to say the truck is designed throughout to relieve the welds of load-carrying employment, the welds in many cases merely sealing joints. This is clearly illustrated in Fig. 2, the cross member having a top plate 70 overlapping the top edges of vertical transverse end plates 71, the welds, indicated at 72, merely forming a union and not being put under any load-supporting strain.

Top plate 70 is made in five pieces welded together, there being a central plate 73, and extension plates 74 adjacent each corner, overlapping the legs 34 and extending longitudinally, as is clearly shown in Fig. 1. The shape of the end plates 71 is clearly shown in Fig. 7. The lateral edges butt the legs 34 and are welded thereto, and a portion 75 extends upwardly through a slit in each plate 74 and laterally over the legs, resting thereon and being welded thereto. Thus the vertical end plates of the cross member are supported directly on top of another member, in keeping with the general manner of construction of the truck to provide extra strength. The rear portions 75 extend laterally beyond the legs 34 for supporting brake rigging parts 26, best shown in Fig. 7. The end plates 71 depend intermediate the legs almost to the bottom of the side frame members.

A plate 76 (Fig. 1) extends between end plates 71 on each side of the longitudinal center line of the truck and spaced therefrom to form an air chamber between the plates 76, each end of each plate 76 having a portion 75' forming a support similar to the aforedescribed portion 75. One plate 76 extends forwardly from the rear end plate 71 and at the forward side of the intermediate axle, changes its direction obliquely outwardly, as is clearly shown in Fig. 1. The other plate 76 is similarly shaped but oppositely directed. Plates 76 extend downwardly to the bottom of plates 71 and are cut away over the intermediate axle. A hood-shaped plate 77 extends between plates 76 at this cut away portion forming a portion of a bottom wall 78 of the air chamber, the remainder of the bottom wall being formed by plates 79 extending forwardly and rearwardly from the bottom edges of the plate 77 to the end plates 71. Oblique plates 80 partition off two corners of the air chamber, as is shown in Fig. 1 to streamline the air flow and prevent air back-flows. These plates 80 are welded to the top plate 70 through slot-shaped perforations, clearly shown in Fig. 1, made in the top plate.

The inlet to the air chamber is formed by an elongated central opening 81 in the top plate 70. The air, which is for cooling electric motors, is forced both forwardly and rearwardly through the air chamber and out openings 82 formed in the end plates 71.

Outwardly of and spaced from each plate 76 is a vertical plate 83 mounted on the end plates 71 by portions 75". Plates 83 are welded to plates 71, 73 and 74. A horizontal plate 84 extending between adjacent pairs of plates 76 and 83 and welded thereto forms a strong supporting structure, box-shaped in cross section, as is best shown in Fig. 6. Plate 83 only extends downwardly to the top of the hood plate 77, plate 84 being in line with the uppermost portion of plate 77 and welded thereto.

An orificed lug 85 depends from each plate 79 beneath each plate 76, making two pairs of aligned lugs. Tension bolts 86 connect the lugs of each pair, reinforcing the bottom of the cross member.

Electric motor support brackets 87 and safety hook device parts 88 extend forwardly and rearwardly from and are welded to the end plates 71. Side bearings 89, formed of an I-beam with a plate welded on top, are supported on and welded to each plate 74. They extend obliquely, as is shown in Fig. 1. Openings 90 are formed in the end plates 71 under plates 84 to reduce weight.

The truck is shown adapted to support electric motors. However, it may be employed as a weight-carrying truck only, if desired.

The lateral motion center plate device 5, best shown in Figs. 10–12, is supported on the central plate 73 of the cross member. It includes two transversely extending roller seats 91 welded on the plate 73, one on each side of and spaced from the opening 81. A channel bracket 92 is welded to the plate 73 at right angles to the seats 91, that is to say one on each of the longitudinal sides of the opening 81 and spaced therefrom. A vertical plate 93 extending transversely of the truck is welded to the inner face of each bracket 92 and to the plate 73, and two vertical plates 94 extend outwardly from plate 93 and are welded thereto and to the plate 73 and bracket 92. A slot 95 is formed in each plate 94.

A plunger 96 is disposed in each slot 95 as is best shown in Fig. 10, the slots having arcuate bottoms. Each plunger has a flange 97 engaging the inner face of the adjacent plate 94 and has a flanged portion 98 extending laterally from the outer face of the adjacent plate 94. The plungers forwardly of the opening 81 are aligned and the plungers rearwardly of the opening 81 are aligned, and aligned plungers are connected by a tie rod 99 which passes through orifices in the plungers, permitting movement of the plungers toward each other, as will later more fully appear. A spacer 100 is loosely mounted on the tie rod intermediate of the plungers and coil springs 101 are compressed between the spacer and the plungers, there being two coil springs on each tie rod. The coil springs exert a pressure on the plungers urging them transversely of the truck with their flanges 97 in engagement with the plates 94. Clips 102 (Fig. 10) are secured by bolts 103 to the plate 94 closing the top of the slots for retaining the plungers therein, the clips having arcuate bottoms. The outer bolts 103 extend between the plates 94 forming an outer tie rod preventing the plates 94 from being bent by forces exerted against them.

Each roller seat 91 has teeth 104 adjacent its ends forming transversely extending racks, and a flat seat 105 between the teeth. A gear 106 is disposed in mesh with each rack. A pin 107 connects the gears in the racks of each seat 91. A roller 108 is disposed on the pin intermediate the gears thereon, the roller seating on the seat 105. Pin 107 extends beyond the gears thereon and a cage 109 is mounted on these ends connecting the gears and rollers on opposite sides of the device 5.

A center plate support 110 is mounted on the rollers 108. It includes a top plate 111 rectangular in shape, vertical walls 112 adjacent plates 93, and vertical walls 113 connecting the ends of walls 112, thus forming an inverted box.

Wear plates 114 are secured both to the plates 93 and walls 112. Seats 115 similar to seats 91 and opposed thereto mount the center plate support on the roller and provide racks for the gears. The walls 113 are not as deep as the walls 112 as is shown in Fig. 11, the cage 109 having portions extending beneath the walls 113.

A cylindrical opening 116 is formed in the top plate 111 and a center plate 117 is secured in the opening 116 and welded to the plate 111. The center plate has a horizontal annular wall 118, a vertical circular wall 119 extending upwardly from the outer margin of the wall 118 and welded thereto and to the top plate 111, and another vertical circular wall 120 welded to and depending from the inner margin of the wall 118 into the opening 84 in spaced relation to the wall thereof. A wear plate 121 is welded to the inner face of wall 119, and a gasket 122 is secured to the upper edge of the wall 119.

A collar 123 is disposed in the opening of wall 118 and welded thereto. This collar communicates with a source of air and serves as an inner wall for the space to receive the center pin (not shown) which fits between the wall 119 and the collar 123 and engages the wall 118. Collar 123 prevents escape of center pin lubricating oil into the air chamber.

A lug 124 extends longitudinally from each end of each wall 112 and is welded thereto, overlapping the portions 98 of the plungers 96. When the center plate is in central position, lugs 124 have only slight clearance from the adjacent ends of plungers 96 so that any lateral movement of the center plate will result in engagement of plungers on one side of the truck by adjacent lugs. Lateral movement of the center plate is permitted by the elongated opening 81 being sufficiently longer than the diameter of wall 120 and by other clearances, and positive rolling of the rollers is effected by the gears 106.

Lateral movement of the center plate relative to the cross member, whether resulting from a force originating in the truck or in the superstructure, moves the lugs on one side of the center plate laterally. The lugs engage the adjacent plungers which move laterally, compressing the springs 101. Springs 101 are supported by the plungers on the other side of the truck which can not move laterally under such a force but abut the adjacent plates 94. The springs offer an increasing resistance as the lateral motion increases. As the rollers and gears roll in a horizontal plane, the load of the superstructure of the vehicle does not offer material resistance to lateral movement.

When the vehicle in passing through curved track, the center plate may be moved laterally toward the outer rail, due to centrifugal force, shifting the load of the superstructure to that side of the longitudinal center line of the truck. This puts more weight on the spring rigging at the outer rail side of the truck than at the other, thereby causing a greater weight-supporting spring deflection at the outer rail side. However, as the outer rail of a curve is usually higher than the inner rail, the laterally moving center plate retains its horizontal position, and the center plate and side bearings are all maintained in substantially horizontal planes, thereby preventing tilting of the superstructure.

Studs 125, secured in the plates 93, overlap the top wall 111 preventing disassociation of the roller gears from their racks. Lateral movement of the center plate is limited by the abutment of the lugs 124 with the adjacent ends of the plate 93.

The entire weight of the superstructure being transmitted to the truck is supported on the center plate, transmitted therefrom to the cross member which, due to the spring rigging, transmits the desired proportion of the weight to each of the axles. The axles are equally spaced longitudinally of the truck. The axis of the center plate is not in vertical alignment with the axis of the intermediate axle but is slightly forward thereof. However, weight may be proportioned to the wheels in any desired manner, either equally or to provide greater weight on the forward wheels. Substantially two-thirds of the weight is distributed to the four-wheel section and one-third to the two-wheel section in conformity with usual practice.

The spring rigging at the forward end of the truck is adapted to support its proportion of the load in such a manner with relation to the manner in which the spring rigging at the rear end of the truck supports its proportion of the load that the frame members of the two-wheel section, the legs 34, and the cross member 4, all retain their horizontal position during vertical movement. Thus the side bearings remain in the same horizontal plane during vertical movement providing improved support for the superstructure.

The aforedescribed truck is adaptable for use in a railway vehicle, one at each end thereof. The truck can be interchangeably operated in either direction without altering any of the component parts thereof or its attachments to the superstructure, and when so operated retains the same degree of cushioning movements.

While there has been hereinbefore described an approved embodiment of this invention, it will be understood that many and various changes and modifications in form, arrangement of parts and details of construction may be made thereto without departing from the spirit of the invention, and that all such changes and modifications as fall within the scope of the appended claims are contemplated as a part of this invention.

The invention claimed and desired to be secured by Letters Patent is:

1. A railway vehicle truck comprising three spaced wheeled axles; side frame members connecting two adjacent axles of said three axles, forming therewith a truck section, each of said members having two longitudinal transversely spaced walls connected by two transverse longitudinally spaced walls; and side frame members supported on the other of said axles, forming therewith another truck section, each of said members thereof having an extension provided with a portion disposed between said walls of and being spring-supported on one of said two-axle section members for vertical relative movement therebetween, said extension portions having parts in sliding engagement with each of said transverse walls and the adjacent portions of said longitudinal walls, holding said sections in longitudinal alignment and effecting squareness of said two-axle section.

2. A railway vehicle truck comprising three spaced wheeled axles; side frame members connecting two adjacent axles of said three axles, forming therewith a truck section, each of said members having two longitudinal transversely spaced walls connected by two transverse longitudinally spaced pedestal members; and side frame members supported on the other of said axles, forming therewith another truck section, each of said members thereof having an extension provided with a portion disposed between said longitudinal walls and said pedestal members of and being spring-supported on one of said two-axle section members for vertical relative movement therebetween, said extension portions having parts in sliding engagement with each of said pedestal members and the adjacent portions of said longitudinal walls, holding said sections in longitudinal alignment and effecting squareness of said two-axial section.

3. A railway vehicle truck comprising two outer wheeled axles and an intermediate wheeled axle; journal boxes supported on said axles; transversely spaced side frame members supported at one end on the journal boxes of one of said outer axles and at the other end on said intermediate axle journal boxes, said members being independent of each other; a semi-elliptic and coil spring group supported on each of said members, the springs of said groups acting in parallel; a semi-elliptic and coil spring group supported on each of said journal boxes of the other of said outer axles, said semi-elliptic spring thereof being in series with the coil springs thereof; and other transversely spaced side frame members for said other outer axle supported on said groups, said groups acting in parallel.

4. A railway vehicle truck comprising two outer wheeled axles and an intermediate spaced wheeled axle; journal boxes supported on said axles; rubber blocks supported on top of the journal boxes of said outer axles, said blocks being resilient laterally; transversely spaced side frame members supported at one end on the rubber blocks of one of said outer axles and at the other end on said intermediate axle journal boxes, said members being independent of each other, said one outer axle and its said journal boxes being adapted to move laterally relative to said members against the yielding resistance of said rubber blocks adjacent thereto; a semi-elliptic and coil spring group supported on each of said members, the springs of said groups acting in parallel; a semi-elliptic and coil spring group supported on each of said blocks of the other of said outer axles, said semi-elliptic spring thereof being in series with the coil springs thereof; and other transversely spaced side frame members for said other outer axle supported on said groups, said groups acting in parallel, said other outer axle and its said journal boxes being adapted to move laterally relative to said other members against the yielding resistance of said other outer axle blocks.

5. A six-wheel railway vehicle truck comprising outer wheeled axles and an intermediate wheeled axle, said axles having journals; journal boxes on said journals; centering devices supported on top of the journal boxes of said outer wheeled axles; separate side frame members connecting one of said outer axles with said intermediate axle, each supported at its outer end on one of said centering devices and at its inner end on one of said intermediate axle journal boxes; springs supported by said members; springs supported on the centering devices of the other of said outer axles; other side frame members for said other outer axle supported on said springs; a cross member rigidly connecting said other side frame members; a laterally movable center plate supported on said cross member; and a centering device coacting with said center plate and cross member, said outer axles with their said journal boxes being adapted to move laterally relative to the adjacent side frame members, said axle lateral movements being yieldingly resisted by said box centering devices and said center plate lateral movement being yieldably resisted by said coacting centering device.

6. A railway vehicle truck comprising two outer wheeled axles and an inner spaced wheeled axle; side frame members connecting one of said outer axles with said inner axle, said one of said outer axles being adapted to move laterally relative to said members; centering devices disposed between said one of said outer axles and said members for yieldingly resisting said lateral movement; other side frame members spring-supported at one end on the other of said outer axles and at the other end on said first mentioned members, said other outer axle being adapted to move laterally relative to said other members; centering devices disposed between said other axle and said other members for yieldingly resisting their said lateral movement; a laterally movable center plate supported on said other members for lateral movement relative thereto; and a centering device supported on said other members for yieldingly resisting said center plate lateral movement, said lateral movements of said outer axles and said center plate and said yielding resistance devices permitting said truck to pass through varying track curvatures and holding said axles in longitudinal alignment on tangent track.

7. A railway vehicle truck comprising a wheeled axle; journal boxes supported thereon; side frame members supported on said journal boxes; and a weight-receiving cross member having spaced transverse vertical plates extending between said side frame members, welded thereto, and provided with laterally extending raised portions supportedly overlapping the top faces of said side frame members and being welded thereto, longitudinal vertical plates spaced from each other and from said side frame members, and extending between said transverse plates, welded thereto, and provided with longitudinally extending raised portions supportedly overlapping the top faces of said transverse plates and being welded thereto, and a horizontal plate, supported on top of said side frame members and vertical plates and welded thereto, having slots through which said portions extend.

8. A railway vehicle truck comprising a wheeled axle; journal boxes supported thereon, side frame members supported on said journal boxes; and a weight-receiving cross member having spaced transverse vertical plates extending between said side frame members, welded thereto, and provided with laterally extending raised portions supportedly overlapping the top faces of said side frame members and being welded thereto, longitudinal vertical plates spaced from each other and from said side frame members, and extending between said transverse plates, welded thereto, and provided at their ends with longitudinally extending portions supportedly overlapping parts of said transverse plates and being welded thereto, and a horizontal plate, supported on top of said side frame members and vertical plates and welded thereto, having slots through which said raised portions extend.

JAMES G. BLUNT.